S. D. CHAPMAN.
SPRING WHEEL.
APPLICATION FILED JUNE 3, 1914. RENEWED SEPT. 5, 1916.
1,204,340.
Patented Nov. 7, 1916.
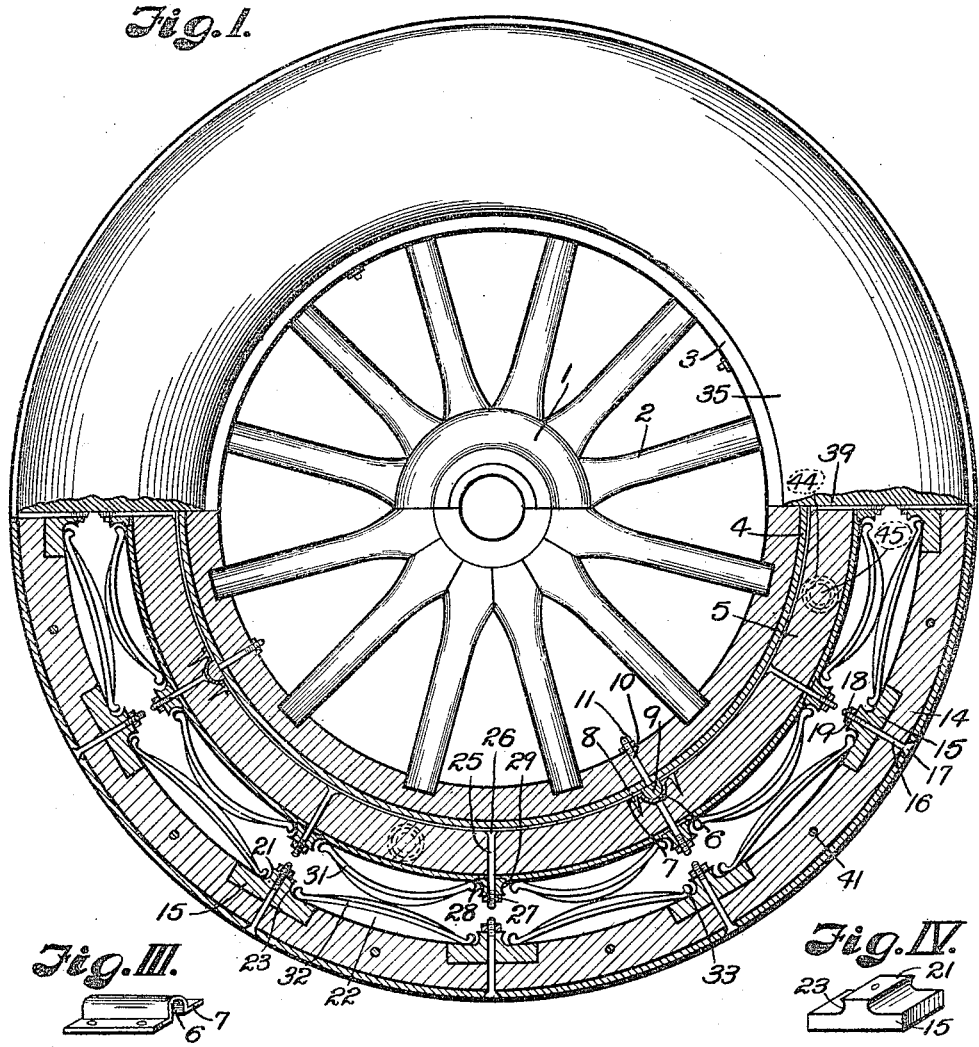
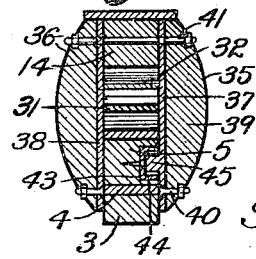
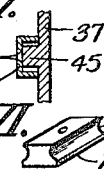
WITNESSES:
INVENTOR
Samuel D. Chapman.
BY
ATTORNEY

UNITED STATES PATENT OFFICE.

SAMUEL D. CHAPMAN, OF KANSAS CITY, MISSOURI.

SPRING-WHEEL.

1,204,340.  Specification of Letters Patent.  Patented Nov. 7, 1916.

Application filed June 3, 1914, Serial No. 842,644.  Renewed September 5, 1916.  Serial No. 118,551.

*To all whom it may concern:*

Be it known that I, SAMUEL D. CHAPMAN, a citizen of the United States, residing at Kansas City, in the county of Jackson and State of Missouri, have invented certain new and useful Improvements in Spring-Wheels; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to spring wheels, and has for its principal object, to provide a device of that character wherein springs are arranged within a circumferential channel of a vehicle wheel to provide resiliency otherwise than by the ordinary pneumatic tire. In accomplishing this object, I have provided the improved details of structure the preferred form of which is illustrated in the accompanying drawing, wherein:—

Figure I is an elevation of a wheel constructed according to my invention, with a portion of the spring channel casing broken away to illustrate the construction and mounting of the springs. Fig. II is a transverse section of the wheel rim or spring casing. Fig. III is a detail perspective view of the rib and socket for anchoring the spring casing to the wheel felly. Fig. IV is a detail perspective view of one of the outside spring abutments. Fig. V is a central section of one of the anchors for the spring casing. Fig. VI is a detail perspective view of one of the inside spring abutments.

Referring more in detail to the drawings: 1 designates the hub, 2 the spokes and 3 the felly of a vehicle wheel, and more particularly the wheel of an automobile or motor struck. Fitting snugly onto the felly 3 is a metal rim 4, and fitting onto the metal rim is an inside casing ring 5, which is preferably composed of wood and is provided at intervals throughout its inner periphery with inset sockets 6, preferably composed of hardened metal and having flanges 7 that are countersunk in the face of the ring and secured thereto by screws or the like 8.

Seated in each of the sockets 6 is a head 9, having a bolt shank 10 extended through the wheel felly and held in place by a nut 11, so that when the parts are assembled, the heads will hold the inner casing ring against creeping on the rim of the wheel. Surrounding and spaced from the inner casing ring 5 is an outer casing ring 14, having abutment blocks 15 mortised thereinto at regular intervals throughout its inner periphery and secured in place by bolts 16 which extend through the blocks and ring and have outer countersunk heads 17 and inner threaded shanks 18; the latter carrying nuts 19 that bear against the inner faces of the blocks. Each of the blocks 15 has an abutment portion 21 projected into the spring channel 22 between the inner and outer casing rings and the opposite faces of the abutment are curved to form sockets 23 for receiving the ends of the cushion spring, presently described.

Fixed to the inner casing ring 5, directly opposite the outer abutment blocks, by bolts 25 having heads 26 at their inner ends countersunk in the inner periphery of the inner casing ring and nuts 27 at their outer ends, are inner abutment blocks 28 having sockets 29 corresponding with the sockets 23 on the outer blocks 15.

Seated loosely within each section formed by the abutment blocks 15 and 28 are inner and outer curved springs 31—32, each having a bowed central portion directed toward the center of the channel, so that the central portions of the paired springs will contact, and having bowed ends 33 adapted for engagement with the socketed portions of the abutment blocks; the springs being of such length that when inert they may lie within their channel sections out of contact with the abutment blocks, but that when under tension they may give outwardly and eventually engage the abutment blocks at both ends.

Covering the sides of the spring casing are cap members 35—36 comprising inner bearing plates 37—38 and overlays 39 of wood or other suitable material, shaped to give the wheel an attractive appearance; the inner edges of the plates and overlays being connected by bolts 40 which extend through the plates and overlays on the same side of the wheel, and the outer edges of the plates and overlays being connected by a number of common bolts 41 which extend through both plates and both overlays and through the outer casing ring 14.

It is apparent that with this construction the outer bolts 41 will hold the parts of the casing together while allowing free movement of the side caps and outer ring relative to the wheel and inner casing ring, and in order to limit this movement I provide the inner ring 5 with a plurality of laterally facing sockets 43 having metal linings 44, and provide the cap plate 37 with bosses 45 which project loosely into the sockets 43, so that creeping of the outer casing ring may be permitted to a determined extent in order to eliminate shock when starting the car.

In using the device presuming the parts to be constructed and assembled as described, and the wheel in service on an automobile or the like, it is apparent that with the proper selection and arrangement of the springs, the weight of the vehicle is cushioned on the springs, so that when the vehicle is traveling over rough ground, the constantly recurring shocks are absorbed by the springs and the same result secured as is secured with an ordinary pneumatic tire.

With the springs properly selected for the particular vehicle with which they are to be used, an ordinary load in the vehicle will compress the springs to some extent, but not sufficiently to induce contact thereof with both of the confining abutment blocks, so that extraordinary shocks are absorbed by the springs as they occur. By separating the springs by the abutment blocks, a number of relatively individual cushions are provided so that the shock or cushion is extended from the point of contact throughout half of the circumference of the wheel.

It is apparent that should any of the individual springs become broken or worn it may be replaced without interfering with the other springs and at small cost. It is also apparent that the wheel may be equipped with a metal or cushion tire and that modification of arrangement or construction may be made without departing from the spirit of the invention.

Having thus described my invention, what I claim as new therein, and desire to secure by Letters-Patent, is:

1. In a vehicle wheel, the combination with a body portion, of spaced inner and outer rings; one of said rings being provided with laterally opening sockets, guards fixed to the other ring, bosses on the guards projected into said sockets; the said bosses being of less diameter than the sockets to provide for limited universal movement of the rings relative to each other, stops fixed to the inner and outer rings at intervals throughout the circumference thereof, and paired springs arranged between adjacent stops and comprising independent members adapted for limited play between the stops and for wiping contact with each other.

2. In a vehicle wheel, the combination with a body portion, of spaced inner and outer rings; one of said rings being provided with laterally opening sockets, guards fixed to the other ring, bosses on the guards projected into said sockets; the said bosses being of less diameter than the sockets to provide for limited universal movement of the rings relative to each other, stops fixed to the inner and outer rings at intervals throughout the circumference thereof, and paired springs arranged between adjacent stops and comprising independent members adapted for limited play between the stops and for wiping contact and longitudinal movement relative to each other.

In testimony whereof I affix my signature in presence of two witnesses.

SAMUEL D. CHAPMAN

Witnesses:
LYNN A. ROBINSON,
L. E. COATS.